(12) United States Patent
Noguchi et al.

(10) Patent No.: US 11,099,689 B2
(45) Date of Patent: Aug. 24, 2021

(54) RECEIVING DEVICE

(71) Applicant: FUJIFILM BUSINESS INNOVATION CORP., Tokyo (JP)

(72) Inventors: Nozomi Noguchi, Kanagawa (JP); Ko Takeuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 402 days.

(21) Appl. No.: 15/934,228

(22) Filed: Mar. 23, 2018

(65) Prior Publication Data

US 2018/0292948 A1 Oct. 11, 2018

(30) Foreign Application Priority Data

Apr. 6, 2017 (JP) ............... JP2017-075734

(51) Int. Cl.
*G06F 3/042* (2006.01)
*G06F 3/041* (2006.01)
(Continued)

(52) U.S. Cl.
CPC .......... *G06F 3/0421* (2013.01); *G06F 3/0412* (2013.01); *G06F 3/1279* (2013.01);
(Continued)

(58) Field of Classification Search
CPC .... G06F 3/03542; G06F 3/037; G06F 3/0386; G06F 1/1643
See application file for complete search history.

(56) References Cited

U.S. PATENT DOCUMENTS 7,903,097 B2 3/2011 Watari
2003/0218760 A1* 11/2003 Tomasi ................ G06F 3/038
356/614
(Continued)

FOREIGN PATENT DOCUMENTS

CN 105324741 A 2/2016
CN 106020511 A 10/2016
(Continued)

OTHER PUBLICATIONS

Mar. 19, 2021 Office Action issued in Japanese Patent Application No. 2017-075734.
(Continued)

*Primary Examiner* — Sanghyuk Park
(74) *Attorney, Agent, or Firm* — Oliff PLC

(57) ABSTRACT

A receiving device includes an optical detector, a first detection region, and a second detection region. The optical detector detects a position of an object of interest to be detected by receiving, with use of one or more of light-receiving portions, reflected light that occurs when light emitted from one or more of light-emitting portions is reflected by the object of interest to be detected. The first detection region is provided at a position closer to the optical detector, and is for detecting movement of the object of interest to be detected with the use of the optical detector. The second detection region is provided at a position farther from the optical detector than the first detection region, and is for detecting presence of the object of interest to be detected with the use of the optical detector.

10 Claims, 8 Drawing Sheets

(51) Int. Cl.
   *G06F 3/12*     (2006.01)
   *H04N 1/00*     (2006.01)
(52) U.S. Cl.
   CPC ..... *H04N 1/00411* (2013.01); *H04N 1/00413* (2013.01); *H04N 1/00424* (2013.01); *H04N 1/00435* (2013.01); *H04N 1/00474* (2013.01); *H04N 2201/0094* (2013.01)

(56) References Cited

U.S. PATENT DOCUMENTS

| | | | | |
|---|---|---|---|---|
| 2009/0303458 | A1* | 12/2009 | Heinks | G01P 3/366 356/5.09 |
| 2018/0217683 | A1* | 8/2018 | Kobayashi | G06F 3/041 |

FOREIGN PATENT DOCUMENTS

| | | | |
|---|---|---|---|
| JP | 2007-65767 | A | 3/2007 |
| JP | 2010-512567 | A | 4/2010 |
| JP | 2016-521874 | A | 7/2016 |

OTHER PUBLICATIONS

Oct. 27, 2020 Office Action issued in Japanese Patent Application No. 2017-075734.
Apr. 15, 2021 Office Action issued in Chinese Patent Application No. 201810198078.7.
Jun. 22, 2021 Office Action issued in Japanese Patent Application No. 2017-075734.

* cited by examiner

RECEIVING DEVICE

CROSS-REFERENCE TO RELATED APPLICATIONS

This application is based on and claims priority under 35 USC 119 from Japanese Patent Application No. 2017-075734 filed Apr. 6, 2017.

BACKGROUND

(i) Technical Field

The present invention relates to a receiving device.

(ii) Related Art

A user interface of a device may be provided with, as an input unit for receiving information for operating the device, a hardware key, which is a key with a concrete form, such as a button or a switch, or a software key, which is a key displayed on a display under software control.

Meanwhile, a user interface that is provided with an optical detector for optically detecting the position of an object of interest to be detected and that receives an input from a user in accordance with the detected position of the object of interest may be used in recent years.

When the object of interest to be detected is at a position closer to the optical detector, the position of the object of interest is detectable more accurately. In contrast, when the object of interest to be detected is at a position distant from the optical detector, the accuracy of the detected position of the object of interest tends to deteriorate. As a result, it is difficult to detect the movement of the object of interest at a position distant from the optical detector. That is, for example, when the user operates a user interface, if the operation is a touch operation involving movement such as dragging or swiping at a position distant from the optical detector, it is difficult to detect this operation.

SUMMARY

According to an aspect of the invention, there is provided a receiving device including an optical detector, a first detection region, and a second detection region. The optical detector detects a position of an object of interest to be detected by receiving, with use of one or more of light-receiving portions, reflected light that occurs when light emitted from one or more of light-emitting portions is reflected by the object of interest to be detected. The first detection region is provided at a position closer to the optical detector, and is for detecting movement of the object of interest to be detected with the use of the optical detector. The second detection region is provided at a position farther from the optical detector than the first detection region, and is for detecting presence of the object of interest to be detected with the use of the optical detector.

BRIEF DESCRIPTION OF THE DRAWINGS

An exemplary embodiment of the present invention will be described in detail based on the following figures, wherein.

DETAILED DESCRIPTION

Hereinafter, an exemplary embodiment will be described in detail with reference to the attached drawings.
Description of Overall Configuration of Image Forming Apparatus 1

Figure 1:
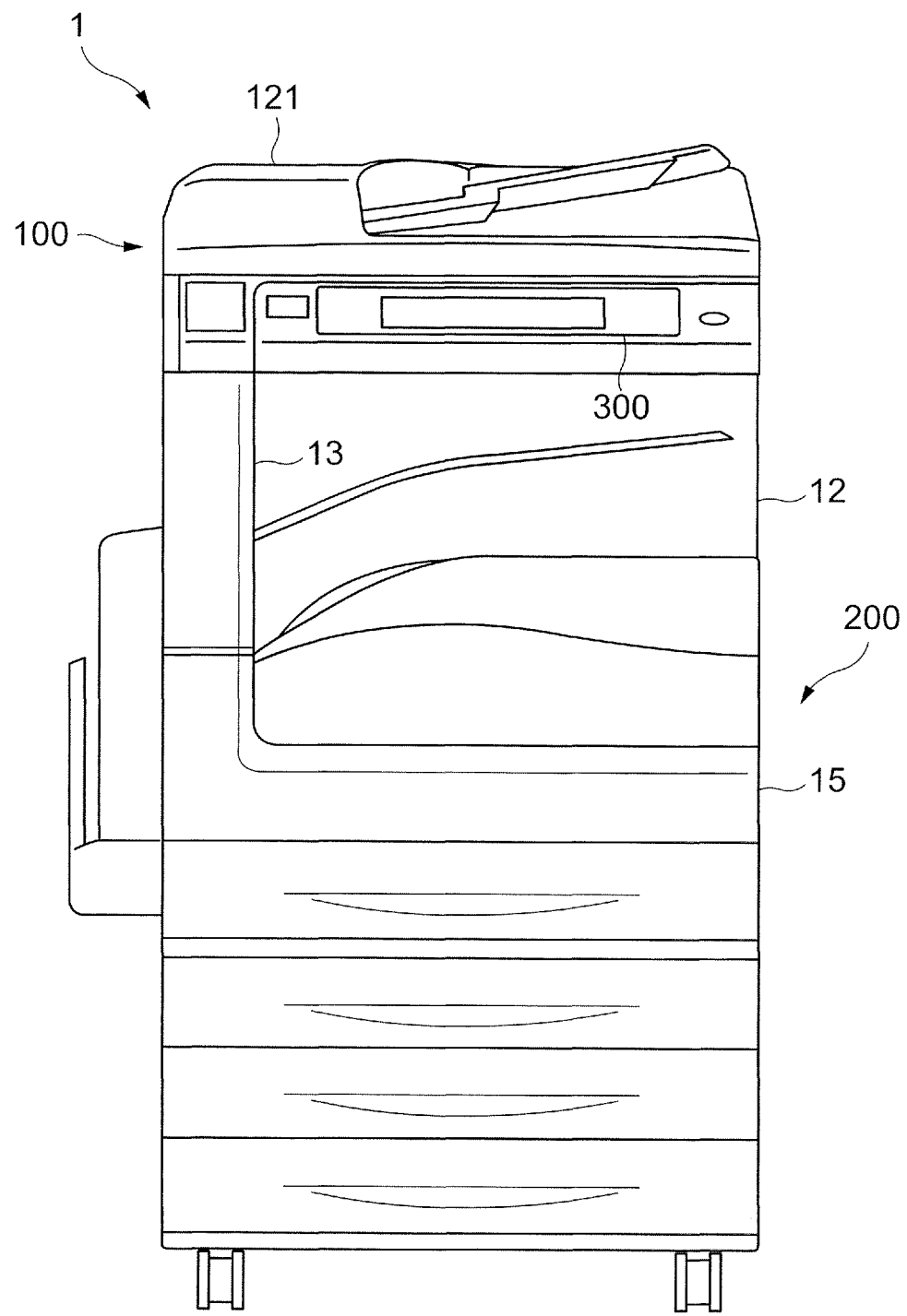
FIG. 1 is an external view of an image forming apparatus according to an exemplary embodiment.
Figure 2:
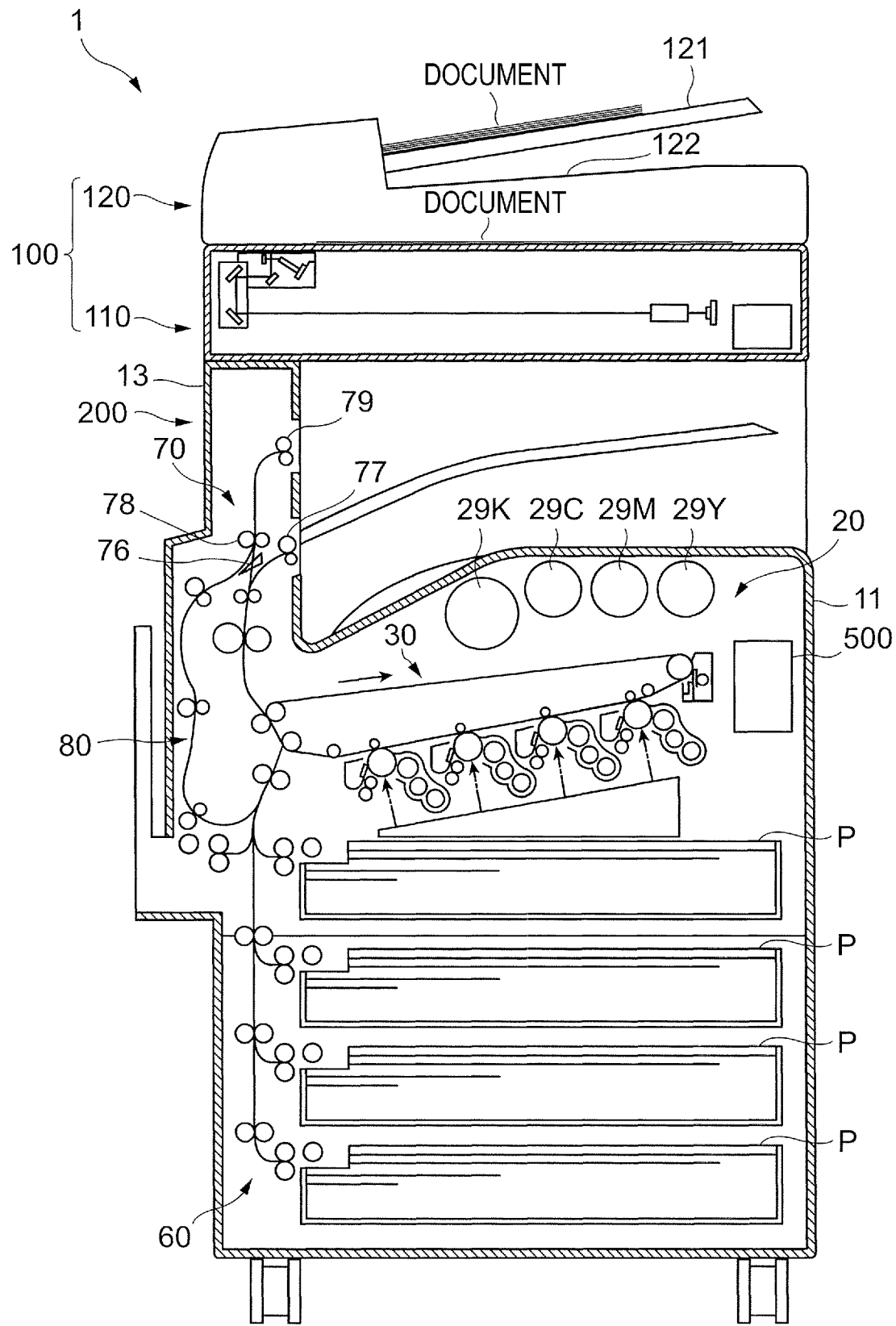
FIG. 2 is a diagram illustrating the internal configuration of the image forming apparatus according to the exemplary embodiment.

FIG. 1 is an external view of an image forming apparatus 1 according to the exemplary embodiment. FIG. 2 is a diagram illustrating the internal configuration of the image forming apparatus 1 according to the exemplary embodiment.

The image forming apparatus 1 includes an image reading device 100, which reads an image of a document, and an image recording device 200, which records an image on a recording material (hereinafter may be represented as "paper"). The image forming apparatus 1 additionally includes a user interface (UI) 300, which receives an operation input from a user and displays different items of information for the user. The image forming apparatus 1 further includes a control device 500, which controls the overall operation of the image forming apparatus 1.

The image reading device 100 is arranged in an upper portion of the image forming apparatus 1, and the image recording device 200 is arranged below the image reading device 100 and contains the control device 500. The user interface 300 is arranged on the front side of an upper portion of the image forming apparatus 1, that is, the front side of a later-described image reading unit 110 of the image reading device 100.

The image reading device 100 includes the image reading unit 110, which reads an image of a document, and a document conveying unit 120, which conveys a document to the image reading unit 110. The document conveying unit 120 is arranged in an upper portion of the image reading device 100, and the image reading unit 110 is arranged in a lower portion of the image reading device 100.

The document conveying unit 120 includes a document accommodation unit 121, which accommodates a document, and a document ejection unit 122, to which the document conveyed from the document accommodation unit 121 is ejected. The document conveying unit 120 conveys a document from the document accommodation unit 121 to the document ejection unit 122. The document conveying unit 120 is also referred to as an auto-document feeder (ADF).

The image recording device 200 includes an image forming unit 20, which forms an image on paper P, a paper supplying unit 60, which supplies paper P to the image forming unit 20, a paper ejecting unit 70, which ejects paper P on which an image has been formed by the image forming unit 20, and a turn-over conveying unit 80, which turns over paper P where an image has been formed on one side by the image forming unit 20 and again conveys the paper P toward the image forming unit 20.

The image recording device 200 additionally includes a device main body frame 11, which directly or indirectly supports the image forming unit 20, the paper supplying unit 60, the paper ejecting unit 70, the turn-over conveying unit 80, and the control device 500, and a device housing 12, which is attached to the device main body frame 11 and forms the outer face of the image forming apparatus 1.

The device main body frame 11 is provided with a reading device supporting unit 13, which contains a switching gate 76, a first ejection roll 77, a conveying roll 78, a second ejection roll 79, and so forth at one of two horizontal end portions of the image forming apparatus 1, and which extends vertically to support the image reading device 100. The reading device supporting unit 13 cooperates with a back side portion of the device main body frame 11 to support the image reading device 100.

The image recording device 200 includes a front cover 15, which is provided on the front side of the image forming unit 20 as part of the device housing 12, and which is mounted to be openable/closable with respect to the device main body frame 11.

By opening the front cover 15, the user is able to replace an intermediate transfer unit 30 and toner cartridges 29Y, 29M, 29C, and 29K of the image forming unit 20 with new ones.

The user interface 300 is an example of a receiving unit (receiving device) that receives an instruction from a user for the apparatus (image forming apparatus 1), and includes an optical detector and a display, which will be described in detail later. The user interface 300 provides the user with different items of information through a screen displayed on the display, and, in response to an operation performed by the user on the display, the optical detector detects that operation. An operation target such as a home button is provided outside the display, and, in response to an operation of the operation target performed by the user, the optical detector similarly detects that operation. As a result, the user is able to input an instruction to the image forming apparatus 1.

Description of Operation of Image Forming Apparatus 1

The image forming apparatus 1 configured as described above operates as follows.

For example, the user is able to photocopy a document using the image forming apparatus 1. That is, a document may be photocopied on the basis of image data of the document read by the image reading device 100 by forming an image on paper P with the use of the image recording device 200. The user is also able to print a document by transmitting a print job to the image forming apparatus 1 from, for example, a personal computer (PC) (not illustrated) connected to a communication link. That is, a document may be printed by receiving a print job through a communication link, and, on the basis of image data included in the print job, forming an image on paper P with the use of the image recording device 200. The user is further able to transmit and receive faxes. That is, image data of a document read by the image reading device 100 may be transmitted through a communication link. Alternatively, the user is able to save image data of a document. That is, image data of a document may be saved in the image forming apparatus 1 or in a PC connected to a communication link.

Description of User Interface 300

Figure 3A:
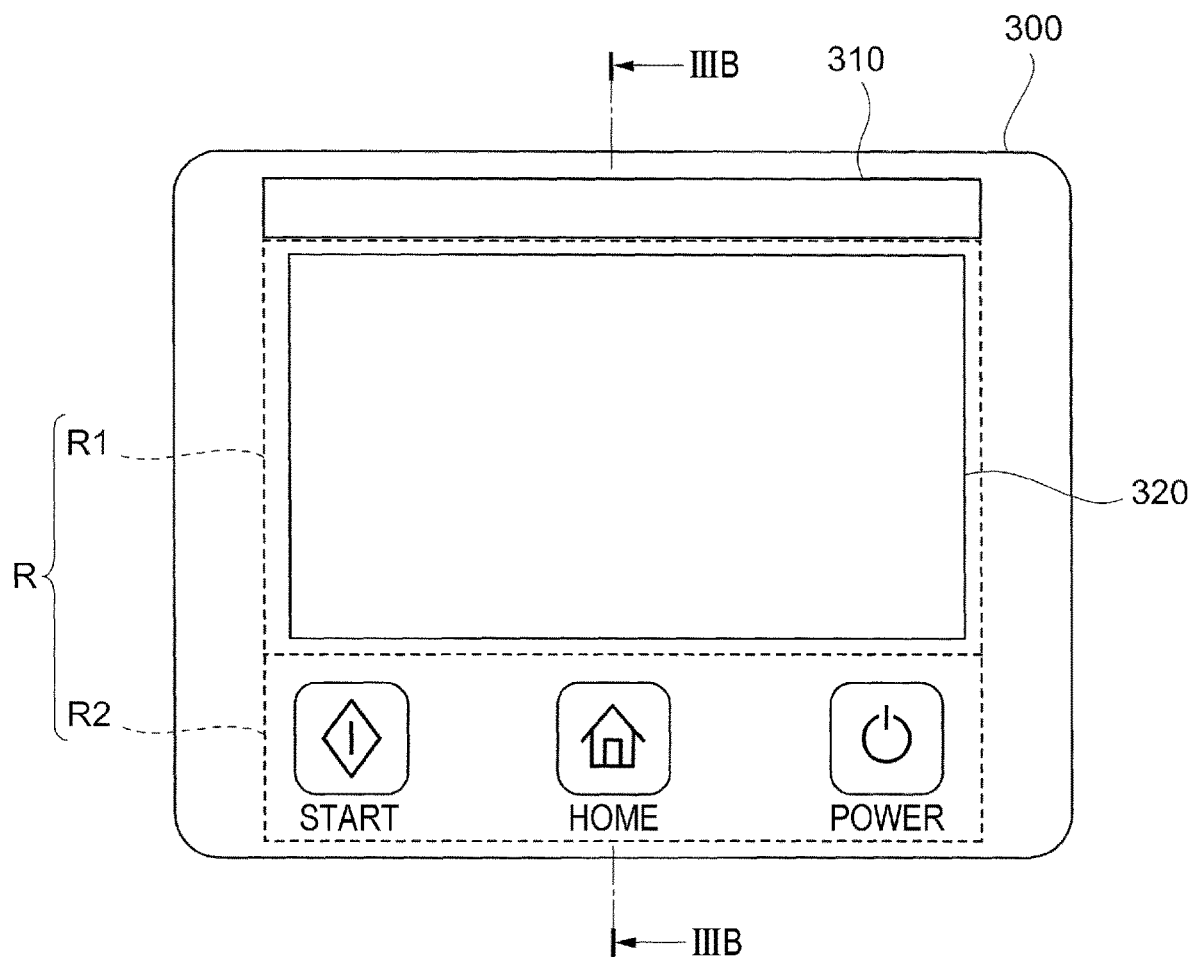
FIG. 3A is a diagram illustrating an exemplary user interface.
Figure 3B:
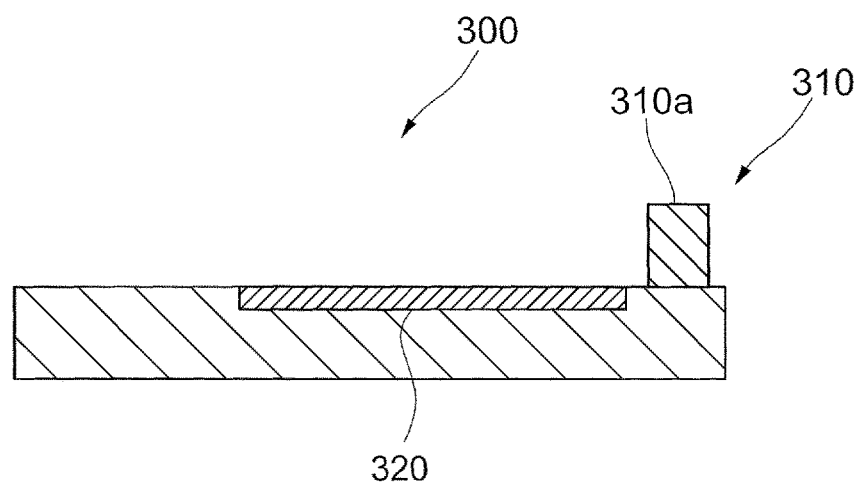
FIG. 3B is a cross-sectional view taken along line IIIB-IIIB of the user interface illustrated in FIG. 3A.

FIG. 3A is a diagram illustrating an example of the user interface 300. FIG. 3B is a cross-sectional view taken along line IIIB-IIIB of the user interface 300 illustrated in FIG. 3A.

As illustrated in FIG. 3A, the user interface 300 includes an optical detector 310, which optically detects an object of interest to be detected, and the display 320, which displays an image.

The optical detector 310 is also referred to as, for example, an optical sensing bar, and detects the position of an object of interest to be detected. When the user tries to operate the user interface 300, for example, if the user is operating the user interface 300 by touching the user interface 300 with a finger, the optical detector 310 detects this finger as an object of interest to be detected. The optical detector 310 is able to detect anything other than the user's finger as long as that thing touches the user interface 300. Therefore, for example, an object of interest to be detected may be a stylus or the like.

Figure 4:
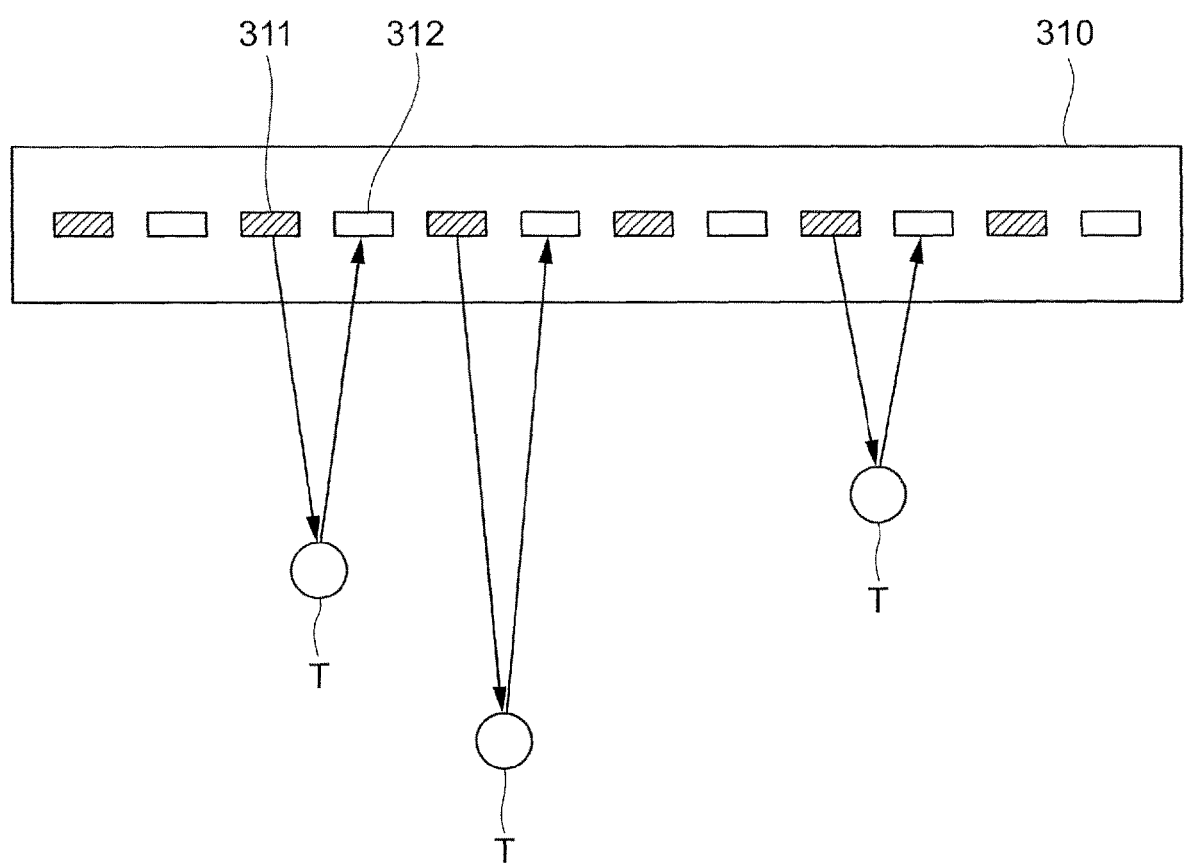
FIG. 4 is a diagram illustrating a method of detecting an object of interest to be detected with the use of an optical detector.

FIG. 4 is a diagram illustrating a method of detecting an object T of interest to be detected with the use of the optical detector 310.

As illustrated in FIG. 4, the optical detector 310 includes light-emitting portions 311, which emit light, and light-receiving portions 312, which receive light.

Each light-emitting portion 311 includes a light-emitting diode (LED) or the like, and emits infrared light or the like.

Each light-receiving portion 312 includes a photodiode (PD) or the like, and receives light reflected from the object T of interest to be detected. Each light-receiving portion 312 outputs a detection signal in accordance with this reflected light.

As illustrated in FIG. 4, the light-emitting portions 311 and the light-receiving portions 312 are alternately arranged in line.

With this configuration, the optical detector 310 is able to detect the position of an object T of interest to be detected by receiving, with the use of one or more of the light-receiving portions 312, reflected light that occurs when light emitted from one or more of the light-emitting portions 311 is reflected by the object T of interest. This is, so to speak, the optical detector 310 being able to detect a two-dimensional position that is the position of an object T of interest to be detected in the vertical and horizontal directions. In other words, the horizontal position of an object T of interest to be detected in FIG. 4 is detectable by determining which of the light-receiving portions 312 has received reflected light, and the vertical position of the object T of interest in FIG. 4 is detectable in accordance with the intensity of the light received by that light-receiving portion 312. That is, the closer the object T of interest is to the optical detector 310, the greater the intensity of the light received by the light-receiving portion 312. In contrast, the farther the object T of interest is from the optical detector 310, the weaker the intensity of the light received by the light-receiving portion 312. Therefore, because the distance between the optical detector 310 and the object T of interest is detectable from the intensity of the light received by the light-receiving portion 312, the position of the object T of interest to be detected in the vertical direction of FIG. 4 is accordingly detectable. Furthermore, even if there are multiple objects T of interest to be detected, the optical detector 310 is able to detect the individual objects T of interest. Accordingly, so-called multi-touch is detectable.

As illustrated in FIG. 3B, the optical detector 310 includes a protruding protrusion 310a on a face where the display 320 of the user interface 300 is provided. The light-emitting portions 311 and the light-receiving portions 312, illustrated in FIG. 4, are arranged on the protrusion 310a. Out of light emitted from the light-emitting portions 311, light that progresses along the face where the display 320 of the user interface 300 is provided hits an object T of interest to be detected and is reflected, thereby becoming reflected light. Out of the reflected light from the object T of interest, light that progresses along the face where the display 320 is provided is received by one or more of the light-receiving portions 312.

The display 320 is, for example, a liquid crystal panel, and displays information regarding the image forming apparatus 1 as an image. As illustrated in FIG. 3A, the display 320 is rectangular, and one optical detector 310 is arranged along one side of the display 320. Here, the optical detector 310 is arranged along the top side of the display 320.

In the exemplary embodiment, a first detection region R1 and a second detection region R2 are provided as a detection region R for detecting an object of interest to be detected with the use of the optical detector 310. The detection region R for detecting the object T of interest with the use of the optical detector 310 is a region at least including a region that is the sum of the first detection region R1 and the second detection region R2.

Accordingly, the optical detector 310 in the exemplary embodiment is arranged along one side of the peripheral of the display 320, and is able to detect two-dimensional position information in the entire detection region R including the first detection region R1 and the second detection region R2. That is, the optical detector 310 may be regarded as a unit that is arranged one-dimensionally outside the detection region R, and that is able to detect two-dimensional position information in the detection region R.

The first detection region R1 is a region that is provided at a position closer to the optical detector 310 and that is for detecting the movement of an object T of interest to be detected with the use of the optical detector 310.

Here, the first detection region R1 includes the region of the display 320, as illustrated in FIG. 3A. Therefore, the optical detector 310 is able to detect, in the first detection region R1, an operation performed by the user on an image displayed on the display 320.

In this case, because the optical detector 310 is able to detect the movement of an object T of interest to be detected on the display 320, the optical detector 310 is able to detect, in the first detection region R1, a touch operation involving movement as an operation performed by the user on the display 320. Here, a touch operation involving movement refers to an operation performed by the user for a certain period of time to move the object T of interest to be detected, such as a finger or a pen, on the display 320. A touch operation includes an operation for changing the contact position of the object T of interest to be detected while keeping the object T of interest in contact with the display 320 (or repeatedly having the object T of interest in and out of contact with the display 320). Examples of a touch operation include flicking, swiping, dragging, scrolling, pinching in, and pinching out done by the user on the display 320. By continuously detecting the presence and position of the object T of interest for a certain period of time, the optical detector 310 is able to detect a touch operation involving movement. That is, when the optical detector 310 detects an object of interest to be detected at a specific position on the display 320 at a specific time point, it is determined that the user has tapped the specific position on the display 320, which is an operation performed by the user on the display 320. Alternatively, when the object T of interest to be detected has been detected for a certain period of time while continuously changing its position, it is determined that the user has performed a touch operation involving movement, such as dragging or swiping, on the display 320, which is an operation performed by the user on the display 320.

Figure 5:
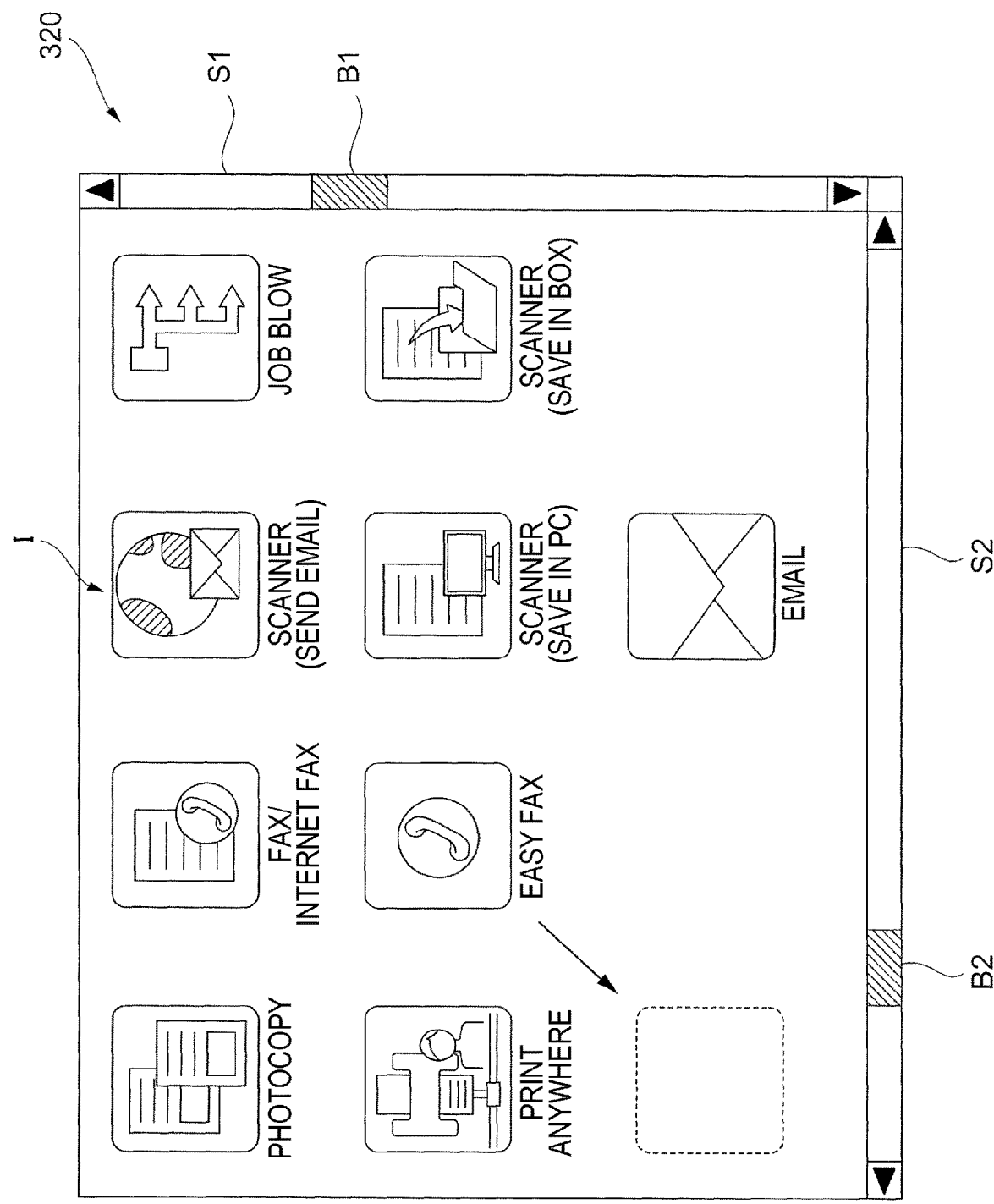
FIG. 5 is a diagram illustrating a specific example of an operation performed by a user on a display.

FIG. 5 is a diagram illustrating a specific example of an operation performed by the user on the display 320.

Here, a list of icons I for executing functions included in the image forming apparatus 1 is displayed as an image on the display 320. This image is a so-called home screen. The icons I displayed here are respectively associated with predetermined processes, and, when one of the icons I is selected, a process associated with the selected icon I is executed.

In the example illustrated in FIG. 5, the display 320 displays the icons I representing the following functions: photocopy, fax/Internet fax, scanner (send email), job flow, print anywhere, easy fax, scanner (save in PC), scanner (save in box), and email.

To use a function that the user wants to use, the user performs an operation to tap a corresponding one of the icons I. When the user taps one of the icons I, for example, a setup screen corresponding to the function associated with the icon I is displayed. For example, when the user taps the icon I of "photocopy", the following setup screen for photocopying a document is displayed: a screen for selecting the number of copies, the type of paper to be used, and whether to perform monochrome or color printing, and setting the scale for enlargement or size reduction. After the setup, when the user presses a later-described start button, the actual photocopy operation starts.

When the user performs an operation to drag one of the icons I, this operation corresponds to moving that icon I. For example, when the user wants to move the icon I of "easy fax" to a position indicated by a dotted line, the user simply drags this icon I.

The display 320 additionally displays a scroll bar S1 for scrolling the screen vertically and a scroll bar S2 for scrolling the screen horizontally.

In this case, when the user taps one of black triangle marks included in the scroll bar S1 and the scroll bar S2, the user is able to scroll the screen in a direction indicated by that black triangle mark. When the user moves a scroll button B1 included in the scroll bar S1 or a scroll button B2 included in the scroll bar S2 by dragging the scroll button B1 or B2, the user is able to scroll the screen in a direction of that movement. By scrolling the screen, a screen not displayed on one screen may be displayed.

As described above, the first detection region R1 is a region for detecting the movement of the object T of interest to be detected with the use of the optical detector 310. A region for detecting the movement of the object T of interest to be detected refers to, in the case of performing different types of operation control of the image forming apparatus 1 including the display 320 on the basis of a user operation received in this region, a region where it may be essential to detect the movement of the object T of interest to be detected, which is an instruction operation for performing the predetermined operation control. In other words, a region where all types of predetermined operation control may be performed only if whether the presence of the object T of interest to be detected is known does not correspond to a region referred to here for detecting the movement of the object T of interest to be detected.

In contrast, the second detection region R2 is a region that is provided at a position farther from the optical detector 310 than the first detection region R1, and that is for detecting the presence of the object T of interest to be detected with the use of the optical detector 310.

That is, the optical detector 310 detects a user's touch operation not involving movement on an operation target in the second detection region R2. Here, a touch operation not involving movement refers to an operation performed by the user to bring the object T of interest to be detected, such as a finger or a pen, into contact with the second detection region R2. A touch operation not involving movement includes an operation of bringing the object T of interest to be detected into contact with an operation target portion in the second detection region R2 at a specific time point once or multiple times, and an operation of keeping the object T of interest to be detected in contact with an operation target portion for a certain period of time. Examples of a touch operation not involving movement include tapping, double tapping, and long tapping (long pressing) done by the user in the second detection region R2. By detecting the presence and position of the object T of interest to be detected at, for example, a specific time point, the optical detector 310 is able to detect a touch operation not involving movement at a specific portion. Note that the optical detector 310 need not detect a touch operation involving movement, such as dragging or swiping, in the second detection region R2.

Here, an operation target is, for example, a button provided in the second detection region R2. Note that the button has no function as an electrical switch for turning on/off the power in response to pressing of the button. When the optical detector 310 detects an object of interest to be detected in the second detection region R2, it is determined that the user has tapped a button located at the detected position.

Figure 6:
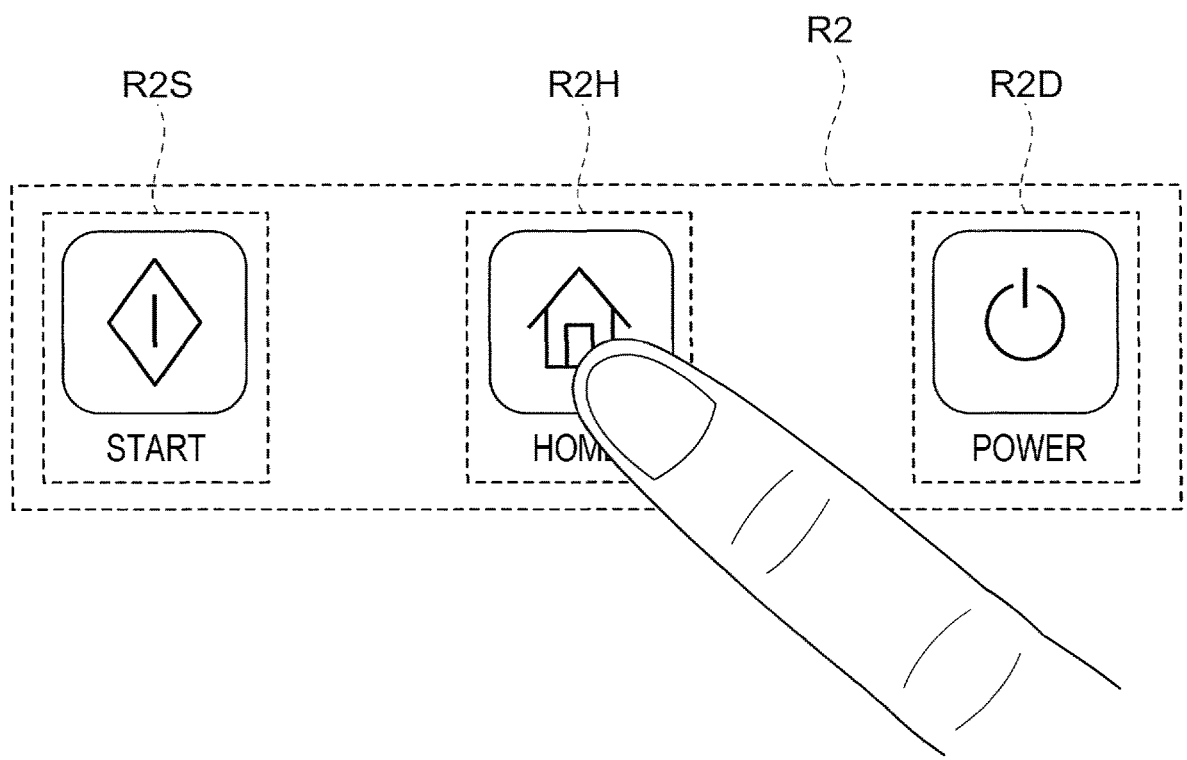
FIG. 6 is a diagram illustrating a specific example of an operation performed by the user in a second detection region.

FIG. 6 is a diagram illustrating a specific example of an operation performed by the user in the second detection region R2.

In the example illustrated in FIG. 6, three buttons are arranged in the second detection region R2. These buttons are, from the left, a start button, a home button, and a power button. The start button is a button for starting the operation of the image forming apparatus 1. The home button is a button for causing the screen of the display 320 to transition to a home screen. The power button is a button for turning on/off the power of the image forming apparatus 1. FIG. 6 illustrates the case where the user has tapped the home button, among these three buttons.

In the exemplary embodiment, an identification display element with which the user is able to recognize each button that serves as an operation target is fixedly provided at a position of this button or at a position adjacent to this button. Here, a frame representing the range of each button is printed as an identification display element. In addition, a mark representing the function of each button is printed within the frame as an identification display element. Furthermore, text representing the function of each button is printed below the frame as an identification display element. In the example illustrated in FIG. 6, frames, marks, and text representing that these buttons are, respectively from the left, the start button, the home button, and the power button are printed.

Regions for determining that the buttons are tapped may be the illustrated frames, or may be respective regions containing these frames. That is, when the user taps a position within a predetermined range outside each of the frames, it is determined that the user has tapped a corresponding one of the buttons. In FIG. 6, a region R2S is illustrated as a region for determining that the start button has been tapped. In addition, a region R2H is illustrated as a region for determining that the home button has been tapped, and a region R2D is illustrated as a region for determining that the power button has been tapped.

Note that these identification display elements are not limited to those printed. For example, these buttons may be partially made light-transmissive, and LEDs or the like below the buttons may emit light to illuminate the marks and the like. In addition, the functions of the buttons may be displayed at the lower side of the display 320. Furthermore, the marks and the like may be projected from the top.

As described above, the second detection region R2 is a region for detecting the presence of the object T of interest to be detected with the use of the optical detector 310. That is, the second detection region R2 may be regarded as a region where the movement of an object of interest to be detected need not necessarily be detected by the optical detector 310. Here, a region for detecting the presence of the object T of interest to be detected (a region where detection of the movement of the object T of interest to be detected is unnecessary) refers to, in the case of performing different types of operation control of the image forming apparatus 1 including the display 320 on the basis of a user operation received in this region, a region where it may be essential to detect the presence of the object T of interest to be detected, which is an instruction operation for performing the predetermined operation control, but the movement of the object T of interest to be detected need not be necessarily detected. In other words, a region where some of the types of predetermined operation control may not be performed unless the movement of the object T of interest to be detected in the detection region is detected does not correspond to a region referred to here for detecting the presence of the object T of interest to be detected.

Description of Control Device 500

Figure 7:
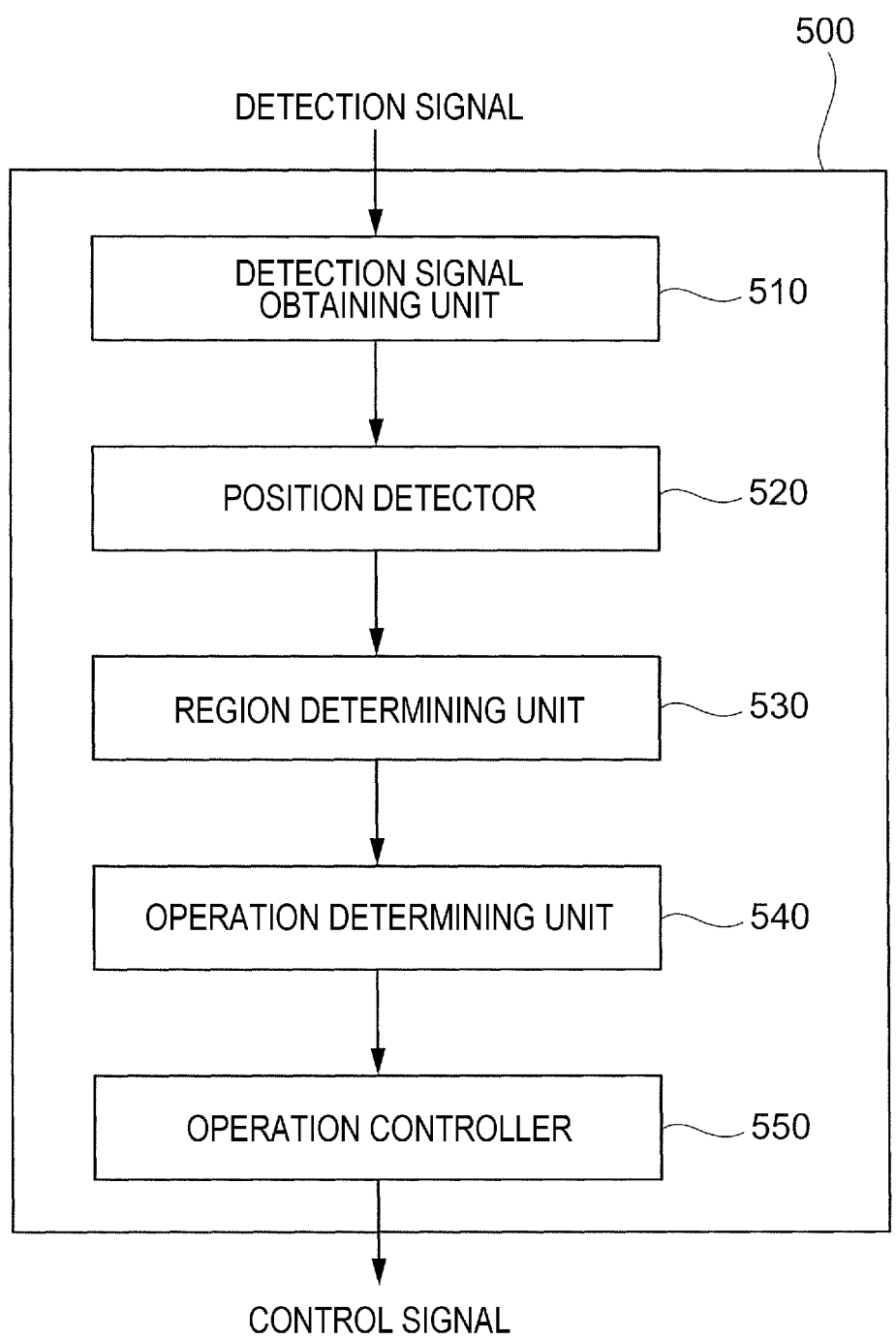
FIG. 7 is a block diagram illustrating an exemplary functional configuration of a control device.

FIG. 7 is a block diagram illustrating an exemplary functional configuration of the control device 500. FIG. 7 illustrates, among different functions included in the control device 500, selective functions that are related to the exemplary embodiment.

The control device 500 is an example of a controller that controls the operation of the image forming apparatus 1 including the user interface 300.

As illustrated in FIG. 7, the control device 500 according to the exemplary embodiment includes a detection signal obtaining unit 510, a position detector 520, a region determining unit 530, an operation determining unit 540, and an operation controller 550.

The detection signal obtaining unit 510 obtains a detection signal from the optical detector 310. The detection signal includes information on the position of one or more light-receiving portions 312 having received light reflected from an object of interest to be detected, and information on the intensity of the light received by the light-receiving portion(s) 312.

The position detector 520 obtains the position of the object of interest on the basis of the detection signal obtained by the detection signal obtaining unit 510. The position is obtainable from information on which of the light-receiving portions 312 has/have received the light, and the intensity of the light received by the light-receiving portion(s) 312, as has been described using FIG. 4.

The region determining unit 530 determines whether the position of the object of interest to be detected is within the first detection region R1 or the second detection region R2, on the basis of the position obtained by the position detector 520.

The operation determining unit 540 determines a user operation on the basis of the position obtained by the position detector 520. That is, the operation determining unit 540 determines which of, for example, tapping, dragging, and swiping has been done as a user operation, on the basis of the position obtained by the position detector 520, as has been described above. As has been described above, the operation determining unit 540 at this time performs control in the first detection region R1, which is provided at a position closer to the optical detector 310, to detect not only the presence of a touch performed by the user, that is, a touch operation not involving movement, but also movement when the user performs a touch, that is, a touch operation involving movement. In contrast, the operation determining unit 540 performs control in the second detection region R2, which is provided at a position farther from the optical detector 310 than the first detection region R1, to detect the presence of a touch performed by the user, that is, a touch operation not involving movement. The operation determining unit 540 does not perform control to detect movement when the user performs a touch, that is, a touch operation involving movement.

The operation controller 550 outputs a control signal on the basis of the position of the object of interest to be detected determined by the position detector 520 and the user operation determined by the operation determining unit 540, and controls the operation of the image forming apparatus 1. For example, when it is determined on the display 320 in the first detection region R1 that the user has tapped the icon I of "photocopy", a screen for the photocopy setup is displayed. Furthermore, when it is determined in the second detection region R2 that the user has tapped the start button, the actual photocopy operation starts. Alternatively, for example, when it is determined in the second detection region R2 that the user has tapped the home button, the screen on the display 320 is caused to transition to the home screen.

Figure 8:
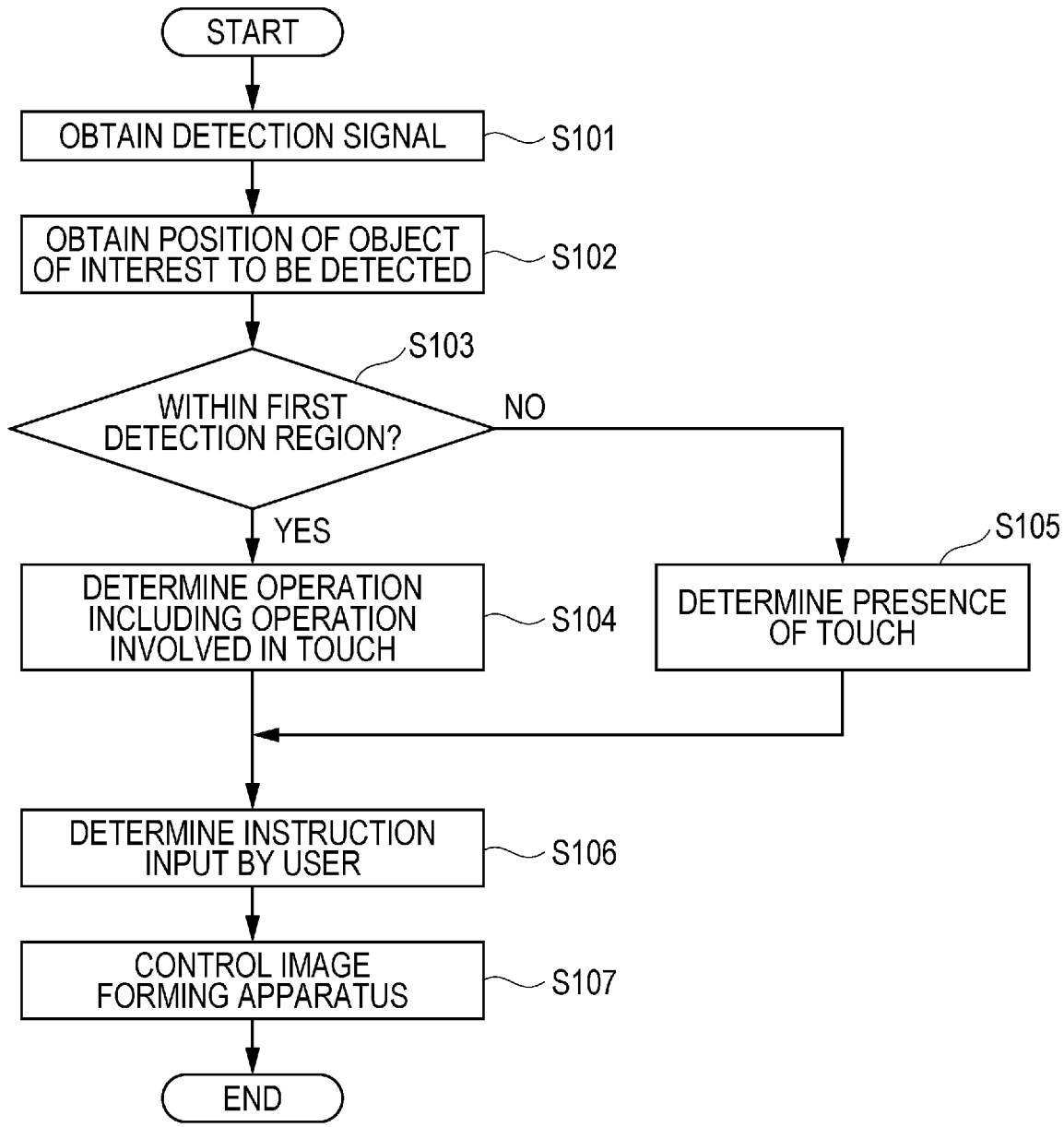
FIG. 8 is a flowchart illustrating the operation of the control device.

FIG. 8 is a flowchart illustrating the operation of the control device 500.

At first, the detection signal obtaining unit 510 obtains a detection signal from the optical detector 310 (step S101).

Next, the position detector 520 obtains the position of the object of interest to be detected on the basis of the detection signal (step S102).

The region determining unit 530 further determines whether the position of the object of interest to be detected is within the first detection region R1, on the basis of the position obtained by the position detector 520 (step S103).

As a result, when the position of the object of interest to be detected is in the first detection region R1 (YES in step S103), the operation determining unit 540 determines what kind of operation the user has performed, including an operation based on a touch operation involving movement, such as tapping, dragging, or swiping (step S104).

In contrast, when the position of the object of interest to be detected is not in the first detection region R1, but in the second detection region R2 (NO in step S103), the operation determining unit 540 determines the presence of a touch on the basis of detection of a touch operation not involving movement, and the determination does not include an operation based on a touch operation involving movement, such as dragging or swiping (step S105).

The operation controller 550 determines an instruction input by the user on the basis of the position of the object of interest determined by the position detector 520 and the user operation determined by the operation determining unit 540 (step S106).

The operation controller 550 further controls the operation of the image forming apparatus 1 in accordance with the instruction input by the user (step S107).

The first detection region R1 is provided at a position closer to the optical detector 310, and accordingly the positional accuracy of a detected object of interest is higher. Therefore, in the exemplary embodiment, this region is used for detecting the movement of an object of interest to be detected, which may require positional accuracy. In contrast, the second detection region R2 is provided at a position farther from the optical detector 310, and accordingly the positional accuracy of a detected object of interest is lower. Therefore, in the exemplary embodiment, this region is used for detecting the presence of an object of interest to be detected, which does not require positional accuracy. As a result, to detect a user operation using the optical detector 310, a problem is less likely to occur in the detection result of a user operation even at a place distant from the optical detector 310.

Because the positional accuracy of a detected object of interest is higher in the first detection region R1, the position of an object of interest to be detected may be detected by the optical detector 310 with higher accuracy. In other words, because positional changes of an object of interest to be detected are more easily detectable in the first detection region R1, this region may be regarded as a region more suitable for detecting a touch operation involving movement, such as dragging or swiping, performed by the user. Therefore, the first detection region R1 may be regarded as a region that is provided at a position closer to the optical detector 310 and that is for more accurately detecting the position of the object of interest to be detected with the use of the optical detector 310.

In contrast, the positional accuracy of a detected object of interest is lower in the second detection region R1 than that in the first detection region R1 because the second detection region R2 is farther from the optical detector 310. Therefore, the accuracy of the position of an object of interest detected by the optical detector 310 is less. In other words, because positional changes of an object of interest to be detected are less easily detectable in the second detection region R2, this region may be regarded as a region more suitable for detecting the presence of a touch, rather than detecting a touch operation involving movement, such as dragging or swiping, performed by the user. Therefore, the second detection region R2 may be regarded as a region that is provided at a position farther from the optical detector 310 than the first detection region R1, and that is for detecting the position of the object of interest to be detected with the use of the optical detector 310 less accurately than in the first detection region R1.

Furthermore, the display 320 is provided in the first detection region R1, and the user performs an operation on a screen displayed on the display 320. The screen changes. To detect on which portion of the changing screen the user performs an operation, it is necessary to detect the position of an object of interest to be detected with higher positional accuracy. A region where display of an operation target changes needs to be provided at a position closer to the optical detector 310, and this region serves as the first detection region R1. Therefore, the first detection region R1 may be regarded as a region that is provided at a position closer to the optical detector 310, where display of an operation target operated by the user changes.

In the second detection region R2, identification display elements such as marks are provided, and the user performs an operation on a button which is an operation target.

Display of this button is fixed and does not change. When an operation target is fixed, detection of whether the user is operating this operation target does not involve very high positional accuracy. Therefore, a region where display of an operation target does not change may be at a position farther from the optical detector 310. Therefore, the second detection region R2 may be regarded as a region that is provided at a position farther from the optical detector 310 than the first detection region R1, where display of an operation target does not change.

The display 320, which displays an image, is provided in the first detection region R1, and a user operation on the image is received. Fixed and non-changing identification display elements, such as display of buttons, are provided in the second display region R2, and the second display region R2 is a non-display section where a display that displays an image is not provided. From this point of view, the display 320 may be regarded as a region that is provided at a position closer to the optical detector 310, that displays an image, and that receives a user operation on the image on the basis of a detection result detected by the optical detector 310. The second detection region R2 may be regarded as a region that is provided at a position farther from the optical detector 310 than the display 320, that fixedly includes identification display elements with which the user is able to recognize operation targets, and that is a non-display section where an operation performed by the user on an operation target is received on the basis of a detection result detected by the optical detector 310.

Although the exemplary embodiment is described using the image forming apparatus 1 by way of example in the above-described example, the exemplary embodiment is not limited to the image forming apparatus 1 and is applicable to any apparatus as long as it detects an object of interest to be detected using the optical detector 310.

Although the image forming apparatus 1 may be regarded as a detection device including the optical detector 310 and the control device 500 in the above-described example, the function of the control device 500 may be included in the optical detector 310 or the user interface 300. In that case, the optical detector 310 or the user interface 300 serves as a detection device.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A receiving device comprising:
    an optical detector that is configured to detect a position of an object of interest by receiving, with use of one or more of light-receiving portions, reflected light that occurs when light emitted from one or more of light-emitting portions is reflected by the object of interest;
    a first detection region of a user interface in which the receiving device is configured to detect movement of the object of interest with use of the optical detector, the first detection region being defined by a first perimeter having a first side that is arranged adjacent to the optical detector and a second side that is opposite the first side and is a most distal side of the first perimeter to the optical detector,
    a second detection region of the user interface in which the receiving device is configured to detect presence and position of the object of interest to be detected, but not movement of the object of interest, the second detection region being defined by a second perimeter having a side that (i) is a most proximal side of the second perimeter to the optical detector, and (ii) is located adjacent to and faces the second side of the first detection region, such that the first detection region is provided in the user interface at a position that is closer to the optical detector than the second detection region; and
    a controller that is programmed to (i) determine, based on a detected position of the object of interest, whether the object of interest is located in the first detection region or the second detection region; (ii) only if it is determined that the object of interest is located in the first detection region, perform control to detect movement of the object of interest; and (iii) if it is determined that the object of interest is located in the second detection region, perform control to detect a touch operation of the object of interest that does not involve movement.

2. The receiving device according to claim 1, further comprising:
    a display that is configured to display an image,
    wherein the first detection region includes a region of the display.

3. The receiving device according to claim 2, wherein the optical detector is configured to detect in the first detection region of the user interface, an operation performed by a user on the image displayed on the display.

4. The receiving device according to claim 2, wherein the optical detector is configured to detect, in the first detection region of the user interface, a touch operation involving movement performed by a user on the display.

5. The receiving device according to claim 2, wherein the display is rectangular, and the optical detector is arranged along one side of the display.

6. The receiving device according to claim 1, wherein the second detection region includes an identification display element that identifies an operation target for performing an operation.

7. The receiving device according to claim 6, wherein the optical detector is configured to detect, in the second detection region, a touch performed by the user on the operation target.

8. The receiving device according to claim 1, wherein the receiving device is configured to more accurately detect the position of the object of interest in the first detection region with use of the optical detector as compared to the second region.

9. A receiving device comprising:
    an optical detector that is configured to detect a position of an object of interest by receiving, with use of one or more of light-receiving portions, reflected light that occurs when light emitted from one or more of light-emitting portions is reflected by the object of interest;
    a first detection region of a user interface in which a first display of a first operation target for performing an operation changes when it is selected by a user; and
    a second detection region of the user interface in which a second display of a second operation target for performing an operation does not change when selected by the user, wherein (i) the first detection region is provided in the user interface at a position that is closer to the optical detector than the second detection region, and (ii) the receiving device is configured to more accurately detect the position of the object of interest in the first detection region with use of the optical detector as compared to the second region.

10. The receiving device according to claim 9, wherein the first detection region is defined by a first perimeter having a first side that is arranged adjacent to the optical detector and a second side that is opposite the first side and is a most distal side of the first perimeter to the optical detector, and the second detection region is defined by a second perimeter having a side that (i) is a most proximal side of the second perimeter to the optical detector, and (ii) is located adjacent to and faces the second side of the first detection region.

* * * * *